United States Patent [19]

Lepelletier

[11] 3,748,930
[45] July 31, 1973

[54] HYDRAULIC SYSTEM FOR CONTROLLING THE CHANGING OF GEAR RATIOS IN AUTOMOTIVE VEHICLE TRANSMISSIONS

[75] Inventor: Pierre André Georges Lepelletier, Paris, France

[73] Assignee: Societe Anonyme Francaise Du Ferodo, Paris, France

[22] Filed: July 30, 1971

[21] Appl. No.: 167,638

[30] Foreign Application Priority Data
Aug. 10, 1970 France .............................. 7029387

[52] U.S. Cl. .................................... 74/864, 74/867
[51] Int. Cl. ............................................. B60k 21/00
[58] Field of Search ..................... 74/867, 863, 864

[56] References Cited
UNITED STATES PATENTS

| 3,621,737 | 11/1971 | Uozumi | 74/868 |
|---|---|---|---|
| 3,580,112 | 5/1971 | Dach | 74/868 |
| 3,641,845 | 2/1972 | Uozumi | 74/867 |

FOREIGN PATENTS OR APPLICATIONS

| 864,514 | 1/1953 | Germany | 74/867 |
|---|---|---|---|

*Primary Examiner*—Arthur T. McKeon
*Attorney*—Young & Thompson

[57] ABSTRACT

A device for controlling the process of changing gear ratios in a transmission system, especially for automobile vehicles, in which each said gear ratio is associated with a hydraulic actuating chamber and is brought into action by communication of said chamber with a supply line connected to a source of pressure, and out of action by communication of said chamber with the return line to a tank, said device comprising a ratio selector interposed between said actuating chambers and said supply line and return line, said selector being adapted, at a definite speed, to connect to said supply line that of the chambers which corresponds to a selected ratio and the remaining chambers to said return line, said device further comprising means for producing a reference pressure and a reversing valve having a bottom position in which the return line of the chamber of the member to be changed is diverted to the reference pressure means, and a top position in which a connection of the return line to said tank is restored, said valve being movable between said positions as a function of the values of the supply pressure put into opposition with the values of the reference pressure so as to take-up the bottom position when the supply pressure is sufficiently low with respect to the reference pressure, and to take-up the top position when the supply pressure is sufficiently high with respect to the reference pressure, said selector being further adapted, during the course of changes of ratio, to connect the reference pressure to the actuating chamber corresponding to the ratio being changed.

17 Claims, 13 Drawing Figures

United States Patent [19]
Lepelletier
[11] 3,748,930
[45] July 31, 1973
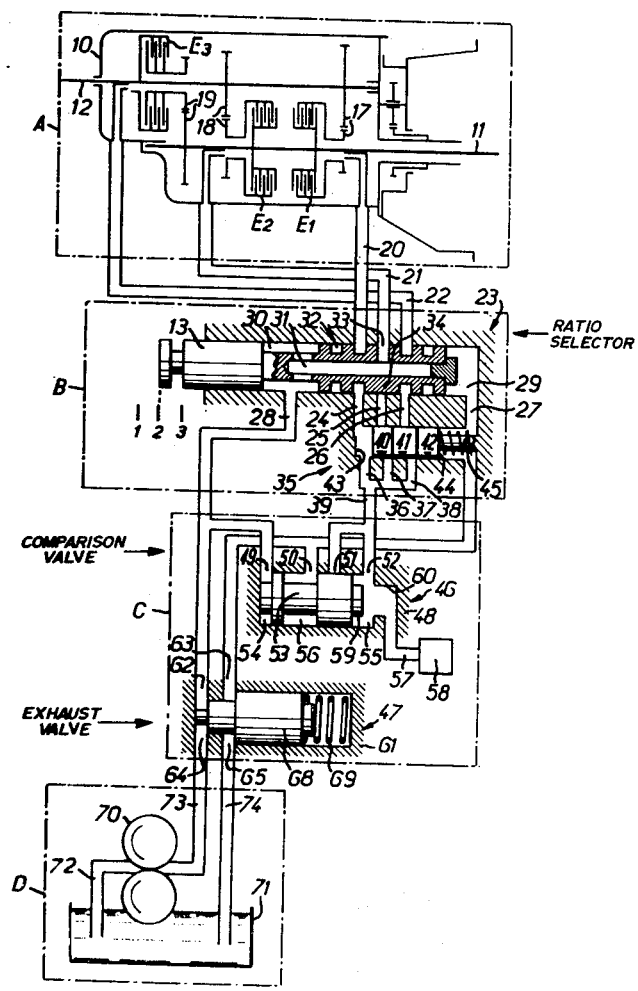

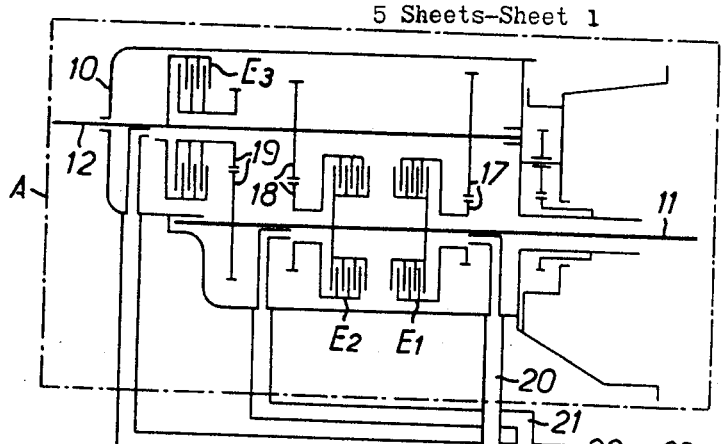
FIG.1
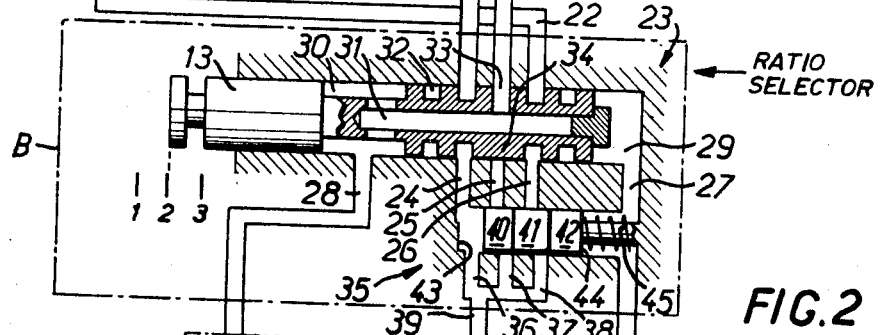
FIG.2
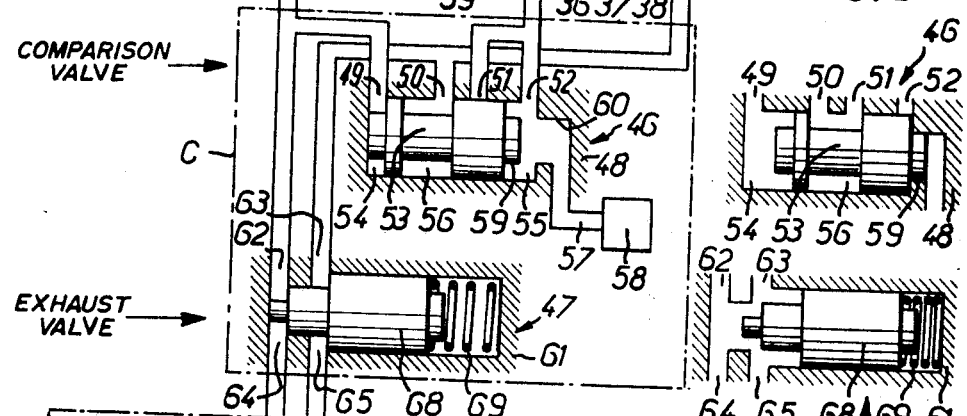
FIG.3
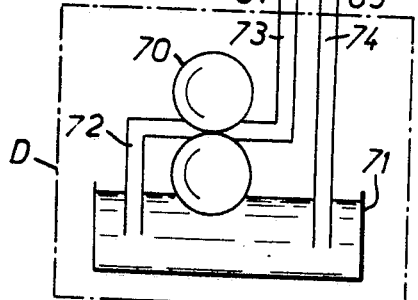

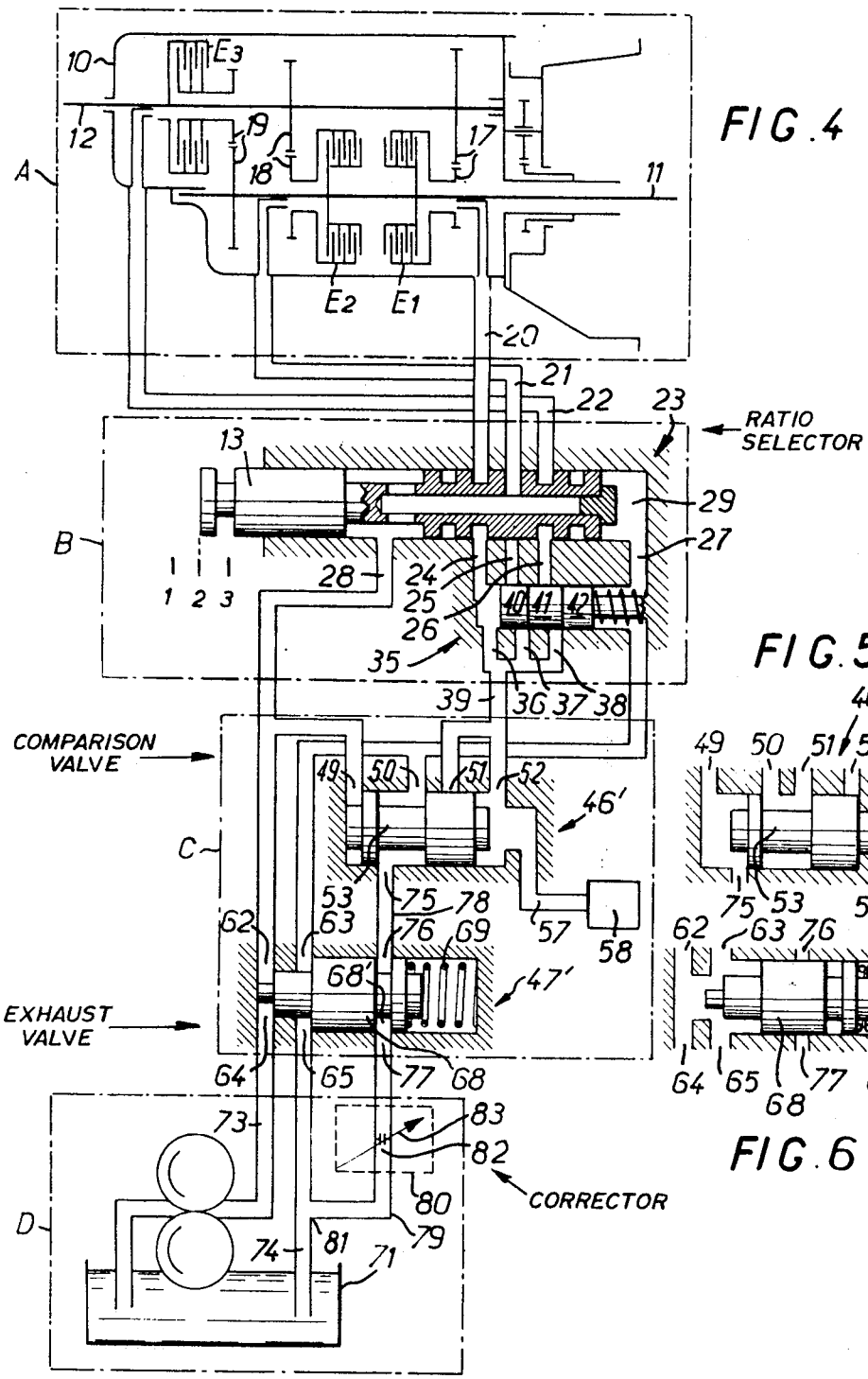

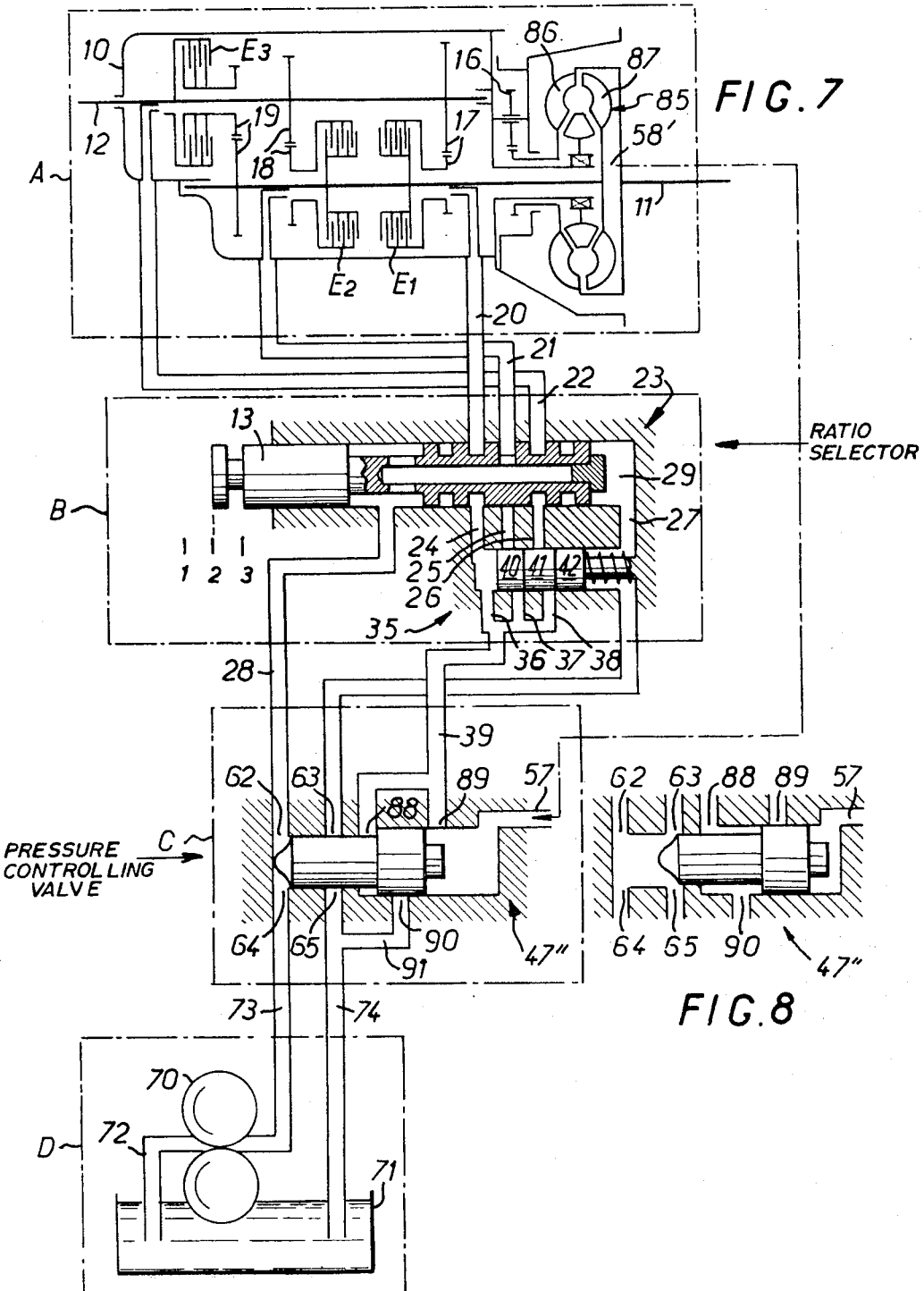

HYDRAULIC SYSTEM FOR CONTROLLING THE CHANGING OF GEAR RATIOS IN AUTOMOTIVE VEHICLE TRANSMISSIONS

The present invention relates to a device for controlling the process of changing speed ratios in a transmission, especially of an automobile vehicle, this device being of the kind in which each ratio is associated with a hydraulic actuating chamber and is brought into action by communication of this chamber with a supply line connected to a source of pressure, and out of action by communication of the said chamber with a return to a tank, the device comprising a ratio selector interpoed between the actuating chambers on the one hand and interposed supply line and the return to the tank on the other, the said selector being adapted at a given speed to connect that of the chambers which corresponds to a selected ratio on the supply line and the remaining chambers on the return.

The present invention has for its object a control device of the kind referred to, generating a process of changes of ratio which is more suitable as compared with the devices existing up to the present time, irrespective of the conditions of operation.

A control device according to the invention is especially characterized by a means developing a reference pressure and by a reversing valve having a bottom position in which it changes the return of the actuating chamber of the member to be left on the said reference pressure means and a high position at which it restores a connection of the said return to the tank, the said valve being displaceable between the said positions as a function of the valves put into opposition, on the one hand of the supply pressure and on the other hand of the reference pressure, so as to occupy the bottom position when the supply pressure is sufficiently low with respect to the reference pressure, and to occupy the top position when the supply pressure is sufficiently high with respect to the reference pressure, the said selector being further adapted during the course of changing ratio to connect the reference pressure on the actuating chamber which corresponds to the ratio which is being left.

By virtue of this arrangement, when the selector is operated so as to pass from one ratio to another, the actuating chamber which corresponds to the new ratio determines for its filling a pressure drop in the supply line, which puts the reversing valve in a bottom position while putting the actuating chamber of the old ratio on deferment of de-clutching which will be terminated when the reversing valve passes to the top position, thus causing the final disengagement of the old ratio.

According to one of the aspects of the invention which is more particularly directed to good conditions of ratio changing when changing-up, especially with a positive torque, that is to say when it is the engine which drives the vehicle, the said reversing valve is a torque-comparison valve and puts into opposition on equal sections of the said valve, the supply pressure and the reference pressure, so as to occupy the bottom position when the supply pressure is lower than the reference pressure and the top position when the supply pressure is higher than the reference pressure, the said reference pressure being indexed on the torque developed by the engine on the gear box.

According to another aspect of the invention which is more particularly directed to good conditions of changing ratios when changing-down gears, especially under a positive torque, that is to say when it is the engine which drives the vehicle, the said reversing valve is a torque pressure valve regulating the supply pressure which puts the supply pressure into opposition with the reference pressure on a smaller section on the side of the supply pressure then on the side of the reference pressure, the said transmission comprising a torque-transmitting device with floating inertia, such as a hydraulic torque converter or hydraulic coupler between the engine and the gear-box, the said reference pressure being indexed on the torque developed by the said floating inertia on the said gear-box.

The control device according to the invention preferably comprises a combination of the two aspects referred to above with two valves, and is characterized in that one of these valves is a torque-comparison valve and puts the supply pressure and the reference pressure into opposition on equal sections, the said transmission comprising a floating inertia device such as a hydraulic torque converter between the engine and the gear-box, the said reference pressure being indexed on the torque developed by the said floating inertia on the said gearbox, the other valve being a torque pressure valve regulating the supply pressure by putting the supply pressure and the reference pressure into opposition on a smaller section on the side of the supply pressure then on the side of the reference pressure, so as to occupy the bottom position when the supply pressure is less than a percentage greater than one hundred of the reference pressure and to occupy the top position when the supply pressure is higher than this percentage.

Forms of embodiment of the invention are described below by way of example, reference being made to the accompanying drawings, in which:

FIG. 1 is a diagram of a control device for the ratio changes of speeds in a transmission according to the invention, this device being more particularly adapted to ensure upward changes in ratio, the device having two valves shown in the bottom position;

FIGS. 2 and 3 show respectively the valves of the device of FIG. 1 in the top position;

FIG. 4 is a diagram similar to that of FIG. 1, but in which the device is furthermore provided with an engagement corrector, the valves being in the bottom position;

Figures 9, 10, 11:
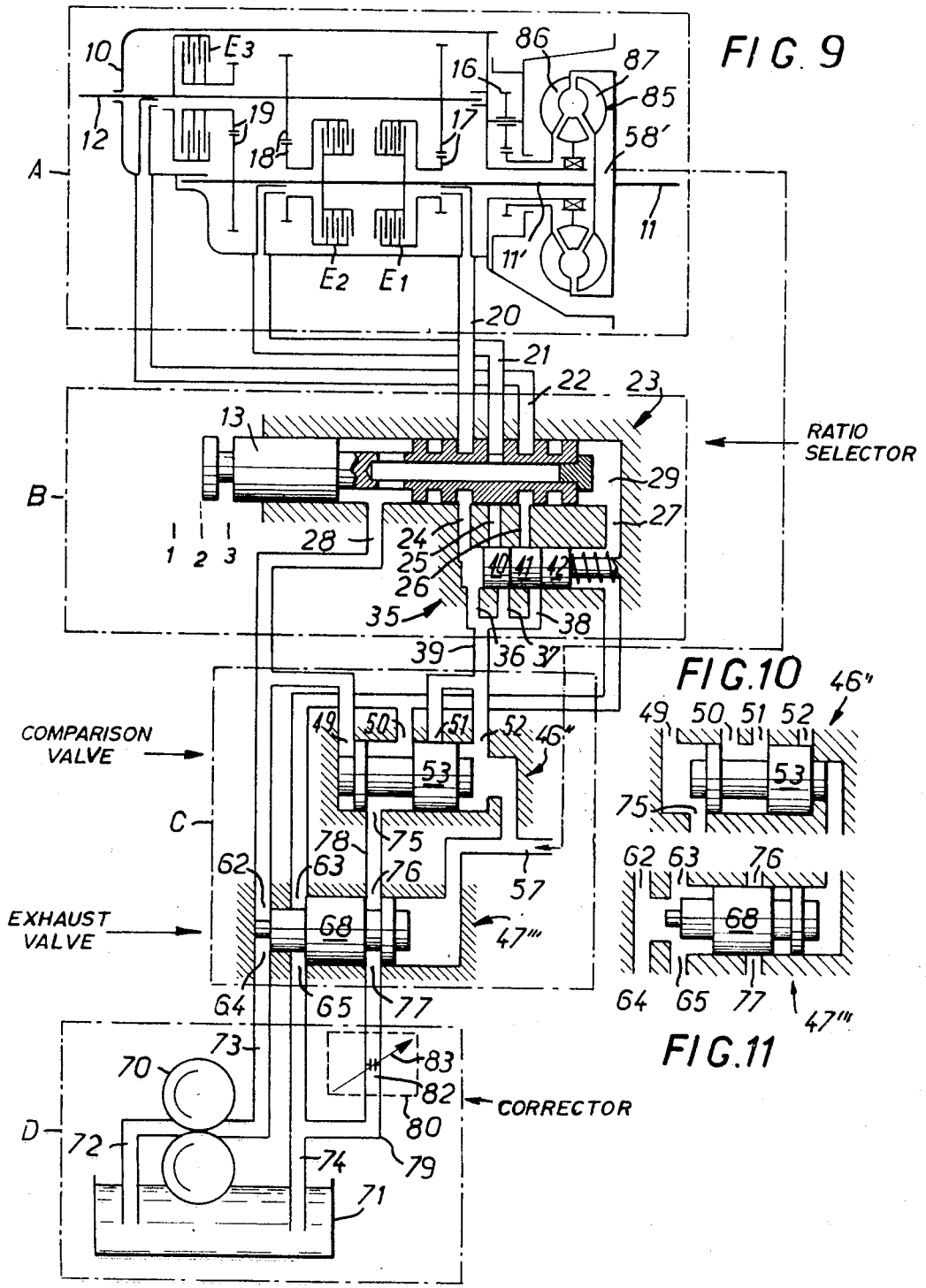
Figure 12:
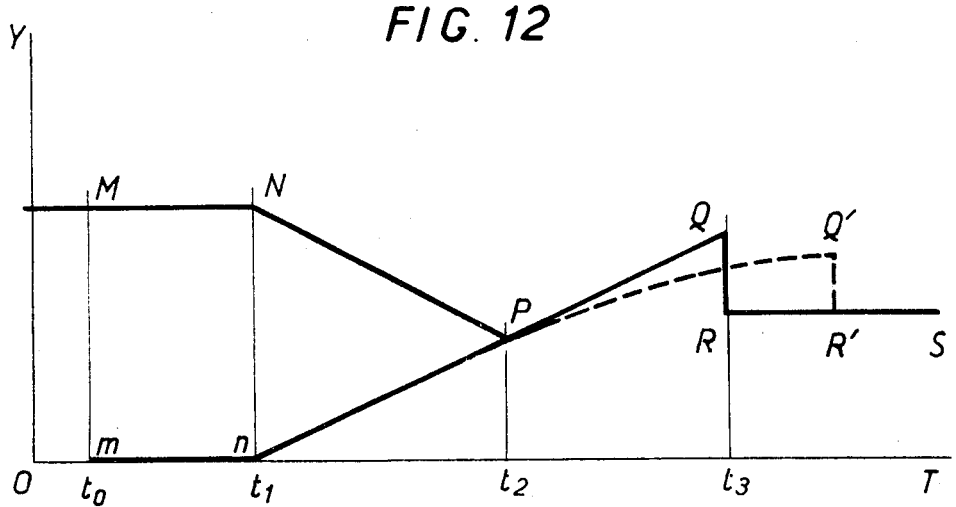
Figure 13:
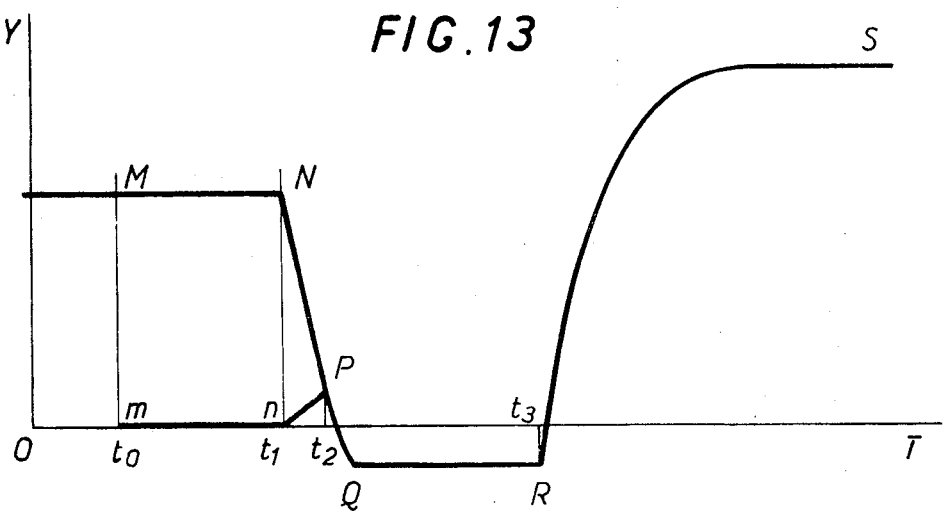

FIGS. 5 and 6 respectively show the valves of the device of FIG.4 in the top position;

FIG.7 is a diagram of an alternative form of the device, in which the device is more particularly adapted to ensure changing-down of gears in synchronism, the device having one valve shown in the bottom position;

FIG.8 shows the valve of the device of FIG.7 in the top position;

FIG.9 is a diagram of another alternative form which combines the arrangement of FIG.4 with that of FIG.7 and which has two valves shown in the bottom position;

FIGS.10 and 11 show respectively the valves of the device of FIG.9 in the top position;

FIG.12 is a diagram which illustrates a changing-up of ratios, the time being plotted in abscissae OT and the torques in ordinates OY, the engine torque being assumed to be constant;

FIG.13 is a diagram similar to that of FIG.12, but illustrating a changing-down of ratio.

Reference will first be made to FIGS.1 to 3. There can be seen in FIG.1 at A a transmission for an automobile vehicle having several gear ratios, at B a selection module of the gear ratios, at C a sybchronization module facilitating the conditions of changing ratios of gears, and at D a module for the hydraulic supply of A, B and C.

The transmission A comprises a gear-box 10 interposed between a driving shaft 11 driven from the engine of the vehicle and a driven shaft 12 coupled to the driving wheels of the vehicle. This box is intended to define, between the shafts 11 and 12, a gear ratio which can be chosen from a plurality of ratios by means of the selection module B, which is adapted to register the passage from one ratio to another on manual or automatic control of a slide-valve 13. The synchronization module C controls the process of gear changing when once the order to change is registered on the selection module B. The supply module D or hydraulic station has especially the function of keeping the selected ratio engaged as long as no change is registered on the selection module B, and to supply the power necessary for the process of gear-changing and for the control by the synchronization module C when once a new ratio is registered on the selection module B.

In the example shown, the gear-box 10 comprises (in addition to a reverse position and a neutral position, not detailed), three forward gear ratios: first, second, third, corresponding to the positions of the slide-valve 13, indicated as such at 1, 2 and 3 and respectively obtained by three gear means 17, 18, 19 interposed between the shafts 11 and 12 and having increasing ratios. In FIG.1 the slide-valve 13 is shown in position 2 corresponding to the second gear.

With the gears 17, 18 and 19 are respectively associated three clutches $E_1$, $E_2$ and $E_3$. The clutch $E_1$ has a hydraulic actuating chamber having a conduit 20 and is engaged when the conduit 20 is under pressure and disengaged when the conduit 20 is not under pressure. The same is true of the clutches $E_2$ and $E_3$ of which the respective conduits can be seen at 21 and 22.

The first gear ratio is obtained when the clutch $E_1$ is engaged and the clutches $E_2$ and $E_3$ disengaged, that is to say when the conduit 20 is under pressure and the conduits 21 and 22 are de-compressed. The second gear ratio is obtained when the clutch $E_2$ is engaged and the clutches $E_1$ and $E_3$ disengaged, that is to say when the conduit 21 is under pressure and the conduits 20 and 22 are de-compressed. The third gear ratio is obtained when the clutch $E_3$ is engaged and the clutches $E_1$ and $E_2$ are disengaged, that is to say when the conduit 22 is under pressure and the conduits 20 and 21 are de-compressed. The actuating chambers of the clutches $E_1$, $E_2$, $E_3$ are determined in such manner that to each value of the hydraulic actuating pressure there will correspond, for each of the clutches, the same proportion of the torque to be transmitted at a pre-determined speed.

In the example shown, the selection module B comprises a slide-valve 13 movably mounted in a body 23 on which are connected side by side in a central region, the three conduits 20, 21, 22 and, opposite these latter, three other conduits 24, 25 and 26, while two further conduits are also connected on the body 23; a conduit 27 arranged on one side of the double set of conduits 20, 21, 22; 24, 25, 26 and a conduit 28 arranged on the other side of this double set.

The conduit 27 communicates with a chamber 29 of the body 23 which is arranged at the end of the slide-valve 13, while the conduit 28 communicates with a space 30 in the body 23 which communicates continuously with an axial bore 31 of the slide-valve 13, in a manner which is always isolated from the chamber 29.

The slide-valve 13 comprises a series of grooves 32 separated by the same distance as that which separates the conduits 20, 21 and 22 or the conduits 24, 25 and 26.

It will be understood that means (not detailed) are provided so as to ensure fixed angular positions of the slide-valve 13 with respect to the body 23 in order to allow the co-operation of the conduit 33 with the conduits 20, 21 and 22 and the co-operation of the closure portion 34 with the conduits 24, 25 and 26 according to the axial positions of the slide-valve.

In position 1, 28 communicates with 20, 21 with 25 and 22 with 26. In position 2 (such as shown in FIG. 1), 28 communicates with 21, 20 with 24 and 22 with 26. In position 3, 28 communicates with 22, 20 with 24, and 21 with 25.

A directing device 35 co-operates with the conduits 24, 25 and 26, this device having three other conduits 36, 37 and 38 placed facing the conduits 24, 25 and 26, and connected to a common conduit 39 in such manner that that of the conduits 24, 25 or 26 which is under a pressure which is either slightly higher than that of the two others or put directly into communication with the conduit 39, in the present case the conduit 24 in the position of FIG.1. To this end, the device 35 comprises three small pistons, known as knuckle bones, 40, 41 and 42, placed freely one following the other, being able to move apart from each other and being movably mounted between two stops 43 and 44 in such manner that an overall pre-determined clearance is provided and permits, depending on the relative values of the pressures at 24, 25 and 26, an intercommunication, either at 24–36 or at 25–37, or at 26–38 (intercommunication at 24-36 in the position shown in FIG.1), at the same time as a prohibition of communication is ensured on the other conduits (25–37 and 26–38 in FIG.1). The small pistons 40, 41 and 42 are urged into abutment at 43 by the action of a spring 45. The conduit 27 communicates with the end face of the piston 42.

The synchronization module C comprises on the one hand a reversing valve 46 forming a comparison valve, and on the other hand a valve 47 acting as a discharge valve.

The comparison valve 46 has a body 48 with four orifices 49, 50, 51 and 52. The orifice 49 is coupled to the conduit 28, the orifice 50 is coupled to the conduit 27 and the orifices 51 and 52 are coupled to the conduit 39.

The valve 46 has a slide-valve 53 with two bearing surfaces defining two end spaces 54 and 55 and a central space 56. The end space 54 communicates continuously with the orifice 49.

The end space 55 communicates continuously with a conduit 57 connected to a means 58 adapted to develop a reference pressure which, in the example of FIG. 1 advantageously represents the torque of the vehicle engine.

The central space 56 continuously communicates with the orifice 50.

The slide-valve 53 is movably mounted between a so-called bottom position (FIG.1) in which the orifice 50 is isolated, or the orifice 51 is covered, and in which the conduit 57 communicates with the orifice 52 and a so-called top position (FIG.2) in which the orifices 50 and 51 are put into communication with each other and in which the orifice 52 is covered.

The slide-valve 53 is urged towards one or the other of its bottom and top positions according to the compared values of the pressures which are developed in the end spaces 54 and 55. When the pressure is higher at 55 than at 54, the slide-valve occupies the bottom position. When the pressure is higher at 54 than at 55, the slide-valve 53 moves towards the top position and the last part of its travel is accelerated by a differential action due to an end piece 59 of smaller diameter engaged in a corresponding bore 60. When returning to the bottom position, this differential action has the effect that when starting, the pressure at 57 must be proportionally higher than the pressure at 54, after which when the piece 59 has escaped from the bore 60, the slide-valve 53 is precipitated into its bottom position.

The valve 47 has a body 61 provided with four orifices 62, 63, 64 and 65. The orifice 62 is connected to the conduit 28, the orifice 63 is connected to the conduit 27, the orifice 64 is coupled to a conduit 73 and the orifice 65 is connected to a conduit 74.

The valve 47 has a slide-valve 68 with two bearing surfaces, which cause the orifices 62 and 64 to communicate continuously with each other, while the orifices 63 and 65 communicate continuously with each other.

The slide-valve 68 is movably mounted between a so-called bottom position (FIG.1) in which the line of conduits 62, 64 is put into communication with the line of conduits 63, 65.

The slide-valve 68 is urged towards the bottom position by a spring 69 and towards the top position by the action of the pressure in the line 62, 64 which is applied at the end of the slide-valve 68.

The top position of the slide-valve 68 is a modulated half-open position of the orifice 65, since when the pressure rises at 64 and pushes the slide-valve 68 towards the right against the action of the spring 69, the orifice 65 is further uncovered and tends to cause the pressure to drop at 64, which brings the slide-valve 68 towards the left and vice-versa, thus ensuring the regulation of the pressure at 64.

The supply module or hydraulic station D comprises, in the example shown, a volumetric pump 70 which is driven at a speed equal or proportional to that of the driving shaft 11, and a tank 71. The pump 70 sucks from the tank 71 through a conduit 72 and supplies a conduit 73 connected to the orifice 64 of the valve 47. A conduit 74 connects the orifice 65 to the tank 71.

It will be noted that the pump 70 constitutes a source of pressure and that the line 73-28 forms a pressure supply line in which the pressure is regulated by the valve 47, while the line 27-74 forms an emptying line to the tank 71. The lines 20, 21 and 22 constitute service lines in supply and in drainage of the clutches $E_1$, $E_2$ and $E_3$. The line 39 is a return line known as the synchronized discharge line, conditioning the drainage of the clutches $E_1$, $E_2$ and $E_3$.

It will more particularly be noted that the valve 46 is a reversing valve having a bottom position (FIG.1) in which it changes over the return 39 to the said reference pressure means 57, 58 and a top position (FIG.2) in which it restores a connection of the return 39 on the tank 71, the said valve 46 being movable between the said positions in dependence on the values put into opposition, on the one hand of the supply pressure at 73-28, and on the other hand of the reference pressure at 57-58, so as to occupy the bottom position when the supply pressure is sufficiently low with respect to the reference pressure, and to occupy the top position when the supply pressure is sufficiently high with respect to the reference pressure.

On a definite gear ratio, that is to say when the slide-valve 13 takes up a position and stays there, the pressure developed by the pump 70 is regulated by the valve 47 by means of the spring 69, which is chosen in such manner that this pressure level at 54 is in any case greater than the maximum value of the pressure delivered at 55 by the reference pressure means 58. The two valves 46 and 47 are therefore in the top position.

Assuming that the slide-valve 13 of the selector module B is in the first gear position 1, the pressure at 20 is maintained through 28-31 and 33 and the clutch $E_1$ is now kept engaged. The clutches $E_2$ and $E_3$ are held disengaged since their conduits 21 and 22 are coupled to the tank 71 through 32, 25, 37-32, 26, 38-39, 51, 50-27, 74. The box 10 is thus maintained with the first gear ratio, the train of small pistons being grouped towards the left.

It will now be assumed that the slide-valve 13 is moved from position 1 to position 2 (position shown in FIG.1) for the purpose of causing the box 10 to pass from the first gear ratio to the second gear ratio, while the engine is effectively driving the vehicle (positive torque). Reference will be made both to FIG.1 and to the diagram of FIG.12, in which the times have been plotted in abscissae OT and the torques in ordinates OY; the output torque on the shaft 12 resulting from two components derived respectively from the clutches $E_1$ and $E_2$, there has been shown on the one hand this output torque at M N P Q R S and on the other hand the component due to the clutch $E_2$ at m n P Q R S.

At $t_0$ in FIG.12 there is shown the instant at which the slide-valve 13 passes from position 1 to position 2, the clutch $E_1$ receiving a pressure corresponding to a torque shown at M, the two valves 46 and 47 being in the top position and the series of small pistons is regrouped towards the left.

The supply line 73, 28 which was initially in relation with the clutch $E_1$ full of fluid under pressure, becomes suddenly put into communication with the clutch $E_2$ which is empty. This results therefore in a collapse of the pressure in the line 73, 28 and there is observed at the instant $t_0$ a full displacement of the slide-valves 53 and 68 of the valves 46 and 47 in the bottom left-hand position (position shown in FIG.1). There is a drop in the valves 46 and 47.

The fluid coming from the clutch $E_1$ pushes back the small pistons 40, 41, 42 towards the right and the clutch $E_1$ is put into communication with the chamber 55 of the valve 46, which is in communication with the reference pressure means 58; at the same time, the small pistons prohibit any communication between 25-37 and 26-38.

The clutch $E_1$, put into relation with the reference pressure means 58 over the path 57, 55, 52, 39, 24, 20 is thus in a state of suspended disengagement.

Simultaneously the clutch $E_2$ becomes filled with fluid, which requires a period of time for filling shown in FIG.12 from $t_0$ to $t_1$. During this time, while the torque is maintained by the clutch $E_1$ in suspension, no substantial pressure is as yet developed in the line 73–28; no torque as yet appears on the clutch $E_2$ which is always waiting, and the previously established condition subsists (see M N).

At the instant $t_1$ at which a sufficient volumne of fluid has been transferred by the line 73,28 into the clutch $E_2$, the pressure begins to rise in this clutch and correspondingly discharges the torque from the clutch $E_1$. By providing the installation with a certain flexibility, there is a rise in pressure, not abrupt but gradual and substantially linear as a function of time. In FIG.12, the rise in pressure and therefore in torque in the clutch $E_2$, translated to the shaft 12, is shown at nP and the corresponding reduction in output torque at NP.

At the point of intersection P, the pressure level in the clutch $E_2$ reaches the pressure level maintained in suspension in the clutch $E_1$ and is sufficient, due to the determination of the actuating chambers, to permit the passage of the whole of the torque for the requirements of the drive.

In the comparison valve 46, the pressure which rises at 73–28 then becomes preponderant with respect to the pressure at 57, and the slide-valve 53 passes rapidly into its top position (FIG.2), as described above.

From then on, the conduit 20 is put into communication via 24, 39, 51, 50, 27, 74 with the tank 71. A rapid disengagement of the clutch $E_1$ takes place.

During this time, the clutch $E_2$ slips, and as the clutch $E_1$ is disengaged, there is produced a tendency to synchronization in the box 10 and the operation passes from the point P to the point Q. At the moment of synchronism, the operation falls abruptly from the point Q to the point R and there is obtained the final condition RS.

By virtue of the arrangement which has just been described, there is obtained a change of gears which automatically possesses the double characteristic, favorable, on the one hand of being insensitive to the dead time of filling of the clutch which it is desired to fill, and on the other hand of transferring rapidly and at the appropriate time the torque from the clutch which it is desired to disengage to that which it is desired to engage, and all this while maintaining a progressive development of the torque.

It will be understood that the operation which has just been described for the change from first gear to second gear is also applicable to all the upward gear changes, especially with a positive torque, this being obtained by means of members absolutely common to all these changes, namely the three modules B, C, D.

Reference will now be made to FIGS.4 to 6 in which the arrangement is similar to that which has just been described with reference to FIG.1, but in which the torque comparison valve, indicated at 46', is provided with an additional orifice 75 which is put into communication with the orifice 50 in the bottom position (as shown in FIG.4) and into communication with the orifice 49 in the top position (as shown in FIG.5). In addition, the valve 47, indicated here by 47', comprises two additional orifices 76 and 77 arranged one opposite the other, and the slide-valve 68 comprises an additional groove 68'. These orifices 76 and 77 are put into communication with each other by the groove 68' in the bottom position (FIG.4) and marked in the bottom position (FIG.6).

The orifices 75 and 76 are coupled together by a conduit 78. The orifice 77 is connected to a conduit 79 which comprises a corrector of engagement 80 and which is connected at 81 to the conduit 74 which returns to the tank 71.

The corrector 80 has a variable time-delay action. This action is provided with a time-delay which diminishes as the accelerator pedal is depressed, and is obtained by an orifice 82 of variable section.

It will therefore be noted that the comparison valve 46', in the top position (FIG.5) and when the supply pressure at 73–28 is sufficiently low, puts the supply line 73–28 into communication with the tank 71 through the intermediary of a conduit 78, 79 which is open at 76, 77 (FIG.4) and which comprises the engagement corrector 80.

In the example shown, the engagement corrector 80 comprises the variable section orifice 82, the section of which is regulated as a function of the amount of depression of the accelerator pedal (shown diagrammatically at 83) of the vehicle, so that the orifice 82 will have a variable section as a function of the amount of depression of the pedal, greater when the pedal is lifted than when it is depressed.

The operation is similar to that which has been described with reference to FIGS.1 to 3, but when, at the instant $t_2$, the point P of the diagram of FIG.12 has been reached at which the valve 46' passes into the top position (FIG.5), the valve 47' being still in the bottom position (FIG.4), the law of rising pressure in the clutch $E_2$ is modified by the coming into action of the clutch corrector 80, for example as shown in broken lines along PQ'. At synchronism there is obtained the drop Q'R' followed by the final state R'S (FIG.12).

As previously, there are obtained the characteristics of insensitivity to the time of filling of $E_2$, of rapid transfer of the torque from $E_1$ to $E_2$ at the appropriate time, and of gradual development of the torques, but in this case the synchronization phase of $E_2$ is adjusted to the driving conditions by means of the corrector 80.

Reference will now be made to FIGS.7 and 8 in which the arrangement is more particularly intended to facilitate the conditions for changing-down gears, especially with a positive torque. In this case, a torque transmitter device with floating inertia is interposed between the driving shaft 11 and the gear-box 10, the floating inertia being coupled to the input shaft 11' of the box 10 and ensuring the transmission of the torque.

The torque-transmission valve is eliminated. The valve 47 in this case designated by the torque-pressure valve 47'', controlling the pressure in the supply line 73 and comprising the orifices 62, 64 and the orifices 63, 65 is subjected to the reference pressure in the conduit 57 instead of being calibrated by the spring 69. The supply pressure at 73–28 acts on the valve 47'' over a smaller section than that on which the reference pressure acts at 57 on the said valve 47''so that the valve 37'' takes up the bottom position (FIG.7) when the supply pressure is lower than a percentage greater than 100 (for example 130 percent) of the reference pressure and occupies the top position (FIG.8) when the supply pressure reaches this percentage of the reference pressure, this percentage being chosen with the purpose of ensuring safety of engagement of the clutches on an established gear ratio.

In addition, the reference pressure is indexed on the torque which is developed on the box 10 by the apparatus transmitting torque with floating inertia, for example a hydraulic torque converter 85, interposed between the driving shaft 11 and the input shaft 11'; as is well known, this torque may be in many cases very different from the driving torque.

There is seen at 86 the impeller wheel of the converter 85 which is coupled to the driving shaft 11, and at 87 the turbine wheel of the said converter 85, which is coupled to the input shaft 11' of the box 10. It is the turbine wheel 87 which constitutes the floating inertia.

The means 58' is such that it develops a reference pressure indexed on the torque of the turbine 87 of the converter 85, for example following an arrangement which has been described in French Patent No. 1,301,881 granted on July 7, 1961 for "Improvements in hydrodynamic torque converters" in the name of the SOCIETE ANONYME FRANCAISE DU FERODO.

The valve 47" comprises three further orifices 88, 89 and 90. The orifices 88 and 89 are coupled to the conduit 39. The orifice 90 is coupled to a conduit 91 connected on the conduit 74. In the bottom position (FIG.7) the orifice 88 is isolated, the orifice 90 is covered while the orifice 89 communicates with the conduit 57. In the top position (FIG.8) the orifice 88 communicates with the orifice 90 and the orifice 89 is masked.

By way of example, there will now be examined the events taking place during changing down gears from second to first with a positive torque, with reference to the diagram of FIG. 13, in which M N Q R S represent the output torque and m n Q R S the component due to the clutch $E_1$.

At the time $t_o$, the instant at which the slide-valve 13 passes from position 2 to position 1, there is a suction of oil on the supply conduit 73 and a fall of the valve 47" from the top position (FIG.8) to the bottom position (FIG.7); at this moment there commences a first phase $t_o$ to $t_1$ at which the fluid flows towards the clutch $E_1$ but without causing as yet any increase in pressure. During this time $E_2$ is put into communication via 89, 39 with the reference pressure at 57, and $E_2$ is put in suspension of declutching with maintenance of the condition previously established (see MN). At the time $t_1$, the pressure begins to rise in the clutch $E_1$ (see nP) and this rise in pressure has the effect of overloading the suspended clutch $E_2$ and beginning its slipping (NP), thus disengaging the turbine-wheel 87 from the shaft 12 and therefore from the vehicle wheels, which causes an immediate acceleration of the turbine wheels. The more the turbine-wheel 87 accelerates, the more it catches up the speed of the driving shaft 11, the more the torque pressure at 57 collapses, and the valve 47" passes very rapidly to the top position, releasing the clutch $E_2$: point P of the figure. The turbine wheel 87 disengaged from $E_2$ accelerates still more and the phenomenon is such that in an extremely short time (less than one tenth of a second for example) it practically catches up the driving shaft 11: point Q. The clutch $E_1$, actuated by the reference pressure at 57, then very low, takes only a very small torque from the output shaft 12 (see QR); during this phase in the course of which $E_1$ continues to slip, the turbine continues to accelerate in agreement with the engine up to the time $t_3$ corresponding to the point R at which the synchronism of $E_1$ is obtained.

The turbine is from that moment again rigidly fixed to the shaft 12 and therefore to the wheels of the vehicle; the impeller continues to accelerate alone and the reference pressure increases and with it the output torque up to the point S at which the first gear condition is established.

It will be noted that this operation is of the type of servo-control by closed loop along the path 58' – 57 – 21 or 20.

It should be observed that the hydrokinetic torque converter 85 constitutes a torque transmitter device with floating inertia which is placed between the engine and the gear-box, and that the reference pressure is indexed on the torque developed by the said floating inertia on the said gear-box.

It will be understood that the floating inertia such as that formed by the converter 85 may be provided not only in the arrangement shown in FIGS.7 and 8, as has been shown, but also in the arrangement of FIGS. 1 to 3, or again in the arrangement of FIGS.4 to 6.

Reference will now be made to the arrangement shown in FIGS.9 to 11, in which are combined the arrangements of FIGS.4 to 6 and 7 and 8.

The comparison valve, indicated by 46" is the same as the valve 46' of FIG.4 and has the same orifices 49, 50, 51, 52 and 75, while being subjected to the pressure of the conduit 57 which is connected to the means 58' associated with the converter 85. The torque pressure valve, indicated by 47''' has the same construction as the valve 47' of FIG.4 with the same orifices 62, 63, 64, 65, 76 and 77 but co-operates, instead of the spring 69, with the pressure of the said conduit 57 coupled to the means 58' like the valve 47" of FIG.7.

The arrangement shown in FIGS.9 to 11 has the effect of combining the advantages of synchronized upward changes of gears according to FIG.4 with the corrector of engagement with that of synchronized changing down according to FIG.7.

It will be noted that:

The invention is equally applicable when the ctuating members of the box are brakes or clutches (such as the clutches shown at $E_1$, $E_2$, $E_3$), or clutches and brakes, irrespective of the number of ratios;

The synchronization modules according to the invention are unique and common for all changes of gears, irrespective of the number of ratios of the gear-box (3, 4, 5 . . . n ratios);

Although there has been described only a changing-up of gears with a positive torque and a changing-down with a positive torque, the invention can be applied without modification in the case of changes with negative torque (engine brake) and irrespective of the type of floating inertia device: in particular, a torque converter working in its torque-conversion stage;

The synchronization module C in association with the selector module B constitutes a logical station which is at the same time simple and adapted to resolve all problems of control of the process of gear-changing, whatever the conditions may be;

These arangements comprise completely independent parameters of construction such as the safely coefficient of the grip of the brakes and/or the clutches on a definite gear, the law of pressure rise in these brakes and/or clutches as a function of time, with or without corrector, degree of differential action of the torque-comparison valve. This independence facilitates the adaptation of the invention to any kind of transmission.

It is possible to replace the slide-valve 13, the displacement of which in one direction or the other corresponds to a successive registration of the gear ratios in the increasing order 1, 2, 3, etc., or the decreasing order 3, 2, 1, by as many individual slide-valves as there are possible gear ratios, each of these individual slide-valves permitting any desired registration of gear ratio irrespective of the preceding registration;

The floating inertia constituted by the hydraulic turbine of the hydraulic torque converter could be that of a hydraulic coupler or it could even be a gas turbine.

What I claim is:

1. A hydraulic system for controlling the changing of gear ratios in a transmission, comprising hydraulic actuating chambers associated with said gear ratios respectively, each said ratio being operative when its associated chamber is pressurized and being inoperative when its associated chamber is depressurized, a first pressure source for developing a supply pressure, a second pressure source for developing a reference pressure, a tank, a synchronizing line means, a ratio selector means for selectively passing from an old ratio to a new ratio, said ratio selector means connecting the chamber associated with the new ratio to said first source while connecting the chamber associated with the old ratio to said line means, and valve means for connecting said line means respectively with either of said second source or said tank according to said supply pressure being respectively lower and higher than a pressure value indexed on said reference pressure.

2. A hydraulic system as claimed in claim 1 wherein aid pressure value is proportional to said reference pressure.

3. A system as claimed in claim 2, in an automotive vehicle having an engine and a gear box, in which said valve means puts said supply pressure and said reference pressure into opposition, with a smaller pressure cross section on the side of the supply pressure than on the side of the reference pressure, said transmission device comprising a torque-transmission apparatus with a driven wheel interposed between the engine and the gear box, said reference pressure being indexed on the torque developed by said driven wheel on the gear box.

4. A hydraulic system as claimed in claim 1 wherein said pressure value is equal to said reference pressure.

5. A system as claimed in claim 4, in which said valve means puts said supply pressure and said reference pressure into opposition on a like pressure cross section, so as to connect said line means with said reference pressure when said supply pressure is lower than the reference pressure and to connect said line means with said tank when said supply pressure is higher than said reference pressure.

6. A system as claimed in claim 5, in which said first source comprises a pump and a spring-calibrated exhaust valve.

7. A system as claimed in claim 5, in an automotive vehicle, in which said reference pressure has a value which represents the vehicle driving torque.

8. A system as claimed in claim 5, in an automotive vehicle having an engine and a gear box, in which said transmission device comprises a torque-transmission apparatus with a driven wheel interposed between the engine and the gear box, said reference pressure being indexed on the torque developed by said driven wheel on said gear box.

9. A system as claimed in claim 5, in which said valve means when it connects said line means with said tank further connects said first source with said tank through the intermediary of a conduit which is open when said supply pressure is sufficiently low and which comprises a corrector means.

10. A system as claimed in claim 9, in which said corrector means has a variable time-delayed action.

11. A system as claimed in claim 10, in an automotive vehicle having an accelerator pedal, in which the action of said corrector means becomes less time-delayed as the accelerator pedal is further depressed.

12. A system as claimed in claim 10, in which said delayed action is obtained by means of an orifice of variable section.

13. A system as claimed in claim 1, in an automotive vehicle having an engine and a gear box, in which said valve means comprises two valves, a first of said valves connecting said line means with said second source when said supply pressure is lower than said reference pressure and connecting said line means with said tank when said supply pressure is higher than said reference pressure, while the second of said valves isolates said first source from said tank when said supply pressure is less than a percentage exceeding 100 of said reference pressure and connects said first source with said tank when said supply pressure is higher than this percentage, said transmission device comprising a torque-transmission apparatus with a driven wheel interposed between the engine and the gear box, said reference pressure being indexed on the torque developed by said driven wheel on said gear box.

14. A system as claimed in claim 13, in which said first valve when it connects said line means with said tank further connects said first source with said tank through the intermediary of a conduit which is open when said second valve isolates said first source from said tank and which comprises a corrector means.

15. A system as claimed in claim 14, in which said corrector means has a variable time-delayed action.

16. A system as claimed in claim 15, in an automotive vehicle having an accelerator pedal, in which the action of said corrector means becomes increasingly less time-delayed as the accelerator pedal is further depressed.

17. A system as claimed in claim 15, in which said time-delayed action is obtained by means of an orifice of variable section.

* * * * *